United States Patent [19]

Tada et al.

[11] 4,354,148

[45] Oct. 12, 1982

[54] APPARATUS FOR CHARGING RECHARGEABLE BATTERY

[75] Inventors: Kinya Tada, Kobe; Kenji Oyamada, Yawata, both of Japan

[73] Assignee: Sanyo Electric Co., Ltd., Moriguchi, Japan

[21] Appl. No.: 138,590

[22] Filed: Apr. 9, 1980

[30] Foreign Application Priority Data

| Apr. 18, 1979 | [JP] | Japan | 54/48138 |
| Apr. 18, 1979 | [JP] | Japan | 54/48139 |
| Aug. 7, 1979 | [JP] | Japan | 54/100996 |
| Aug. 8, 1979 | [JP] | Japan | 54/101637 |
| Aug. 11, 1979 | [JP] | Japan | 54/102676 |

[51] Int. Cl.$^3$ .............................................. H02J 7/04
[52] U.S. Cl. .................................. 320/20; 320/39; 320/40
[58] Field of Search ........................... 320/20, 39, 40

[56] References Cited

U.S. PATENT DOCUMENTS

| 3,603,862 | 9/1971 | Chase et al. | 320/39 |
| 3,794,905 | 2/1974 | Long | 320/39 X |
| 3,938,021 | 2/1976 | Kosmin | 320/40 |
| 4,134,056 | 1/1979 | Fukuii et al. | 320/20 |
| 4,213,081 | 7/1980 | Taylor | 320/20 X |

Primary Examiner—Robert J. Hickey
Attorney, Agent, or Firm—Darby & Darby

[57] ABSTRACT

A rechargeable battery is supplied with a charging voltage from a charging voltage source and exhibits a charging voltage characteristic having a peak shortly before the rechargeable battery reaches a fully charged state. A resistor voltage dividing circuit having a plurality of voltage output terminals is connected to both terminals of the rechargeable battery. A voltage memory device is provided for storing a predetermined voltage based on a voltage supplied from the voltage dividing circuit corresponding to the peak point of the charging voltage characteristic and comparison is made of the other output voltage obtained from the voltage dividing circuit after the peak point is passed and the stored voltage in the voltage memory device and a supply of a charging power from the charging voltage source to the rechargeable battery is interrupted when the difference between these voltages becomes zero.

33 Claims, 19 Drawing Figures

APPARATUS FOR CHARGING RECHARGEABLE BATTERY

BACKGROUND OF THE INVENTION

1. Field of the Invention

The present invention relates to an apparatus for charging a rechargeable battery. More specifically, the present invention relates to an apparatus for charging a gas tight sealed rechargeable battery which exhibits a charging voltage characteristic having a peak shortly before the battery reaches a fully charged state, whereupon the voltage gradually decreases until the battery reaches a fully charged state.

2. Description of the Prior Art

Conventionally the so-called rapid charging for charging a battery with an increased charging current value as well as the so-called trickle charging has been effected in a rechargeable battery. In effecting such rapid charging, it is necessary to detect a charged state of a battery being charged and to interrupt a charging current in order to avoid overcharging.

On the other hand, it has been well known that a gas tight sealed battery such as a nickel-cadmium battery exhibits a charging characteristic as shown in FIG. 1. The charging quantity characteristic of such gas tight sealed battery exhibits a change as shown by the curve B in FIG. 1, in which the saturated state is a fully charged state of the battery. The charging voltage characteristic of such gas tight sealed battery is shown by the curve A in FIG. 1, which exhibits an increase until a peak (as denoted as a) shortly before a fully charged state is reached and thereafter exhibits a gradual decrease until a fully charged state is reached. Therefore, if and when a simple approach is employed to interrupt a charging current by detecting a charged state of a battery in rapid charging as described previously, an overcharged state or an undercharged state results. In order to avoid such state and in order to properly charge a battery, therefore, various approaches were proposed and put into practical use.

One of the prior art approach of interest to the present invention is disclosed in U.S. Pat. No. 4,134,056 issued Jan. 9, 1979 to the same assignee as the present invention. The charging apparatus disclosed in the referenced United States patent was considerably advantageous as compared with the prior art at that time. Nevertheless, the charging apparatus disclosed in the referenced U.S. patent still involves a problem to be solved. More specifically, the apparatus disclosed in the referenced United States patent is adapted to interrupt a charging current upon detection of a charged state of a rechargeable battery based on the level of a differentiated output voltage of a charged voltage. Therefore, the characteristic of the differential output voltage is diversified because of the diversified characteristic of batteries and accordingly it is difficult to secure a predetermined charging quantity (%) for each of the batteries having different characteristics.

Another prior art approach of interest to the present invention is disclosed in Japanese Pat. No. 960,966 published for opposition Oct. 28, 1978 and granted June 28, 1979. The charging apparatus disclosed in the referenced Japanese patent is adapted such that a variation of the voltage per unit time of the charging voltage characteristic curve, i.e. a differentiation coefficient of the charging voltage characteristic is detected, so that the charging current is interrupted when the differentiation coefficient reaches zero or a given minus value. However, even the charging apparatus disclosed in the referenced Japanese patent still involves a problem to be solved. More specifically, as seen from FIG. 1, when the charging current is interrupted at the differentiated value being zero, the differentiated value being zero means the peak point a on the curve A in FIG. 1, i.e. the timing $t_1$. As further seen from the curve B, the timing $t_1$ is not yet a fully charged state of the battery, wherein the battery has not been fully charged. Nevertheless, even if it is adapted such that the charging current is interrupted when the differentiated value becomes a given minus value, a predetermined charging quantity cannot be necessarily secured, i.e. the charging voltage characteristic largely fluctuates depending on the ambient temperature. On the other hand, according to the referenced Japanese patent, such differentiated value is detected at predetermined time intervals. Therefore, if and when the charging voltage characteristic largely fluctuates, the detecting time point is largely different and in an extreme case, it could happen that such an arbitrary minus value of the differentiated value cannot be detected and the charging operation cannot be terminated, with the result that the battery is overcharged.

SUMMARY OF THE INVENTION

Briefly described, the present invention is adapted such that when the charging voltage characteristic exhibits a peak a voltage lower, by a given voltage, than the terminal voltage of a rechargeable battery at that timing or a voltage proportional thereto is stored. Although the terminal voltage or the proportional voltage decreases in accordance with the charging voltage characteristic when the battery is further charged after the peak point of the charging voltage characteristic, comparison is made of the terminal voltage or the proportional voltage thus decreasing and the stored voltage, whereby a charging power from a charging voltage source to the rechargeable battery is controlled.

According to the present invention, since skillful use is made of a change in the charging voltage characteristic of a gas tight sealed rechargeable battery and a charging current is controlled based on comparison of the actual terminal voltage or the proportional voltage and the stored voltage, if and when it is adapted such that a charging current is interrupted upon coincidence of these two voltages, the timing for interrupting the charging current becomes necessarily after the peak of the charging voltage characteristic and accordingly the charging quantity of the rechargeable battery can be increased as compared with the conventional approaches. Although the charging voltage characteristic of a rechargeable battery is influenced by the ambient temperature and accordingly the timing for interrupting a charging current is slightly variable even according to the present invention, nevertheless an influence exerted by such ambient temperature can be much more mitigated according to the present invention as compared with the conventional approaches wherein a differentiated value is detected, for example.

In a preferred embodiment of the present invention, a resistor voltage dividing circuit having a plurality of voltage output terminals is connected to both terminals of a rechargeable battery and a predetermined voltage from the output terminal of the voltage dividing circuit is stored in a voltage memory device at the peak timing of the charging voltage characteristic. According to the present preferred embodiment, such voltage can be stored or memorized with ease. Accordingly, an apparatus for charging a battery with an increased charging quantity even in a rapid charging mode can be provided with a relatively simple structure. By providing a constant voltage element such as a Zener diode in a voltage dividing circuit, an error ocurring in comparison of the stored voltage and the actual terminal voltage of the proportional voltage can be suppressed, whereby a fluctuation of the timing for interrupting a charging current can be further suppressed.

In another preferred embodiment of the present invention, if and when an abnormally high voltage is applied to a voltage memory device, such voltage is detected, whereby a charging current path to the rechargeable battery is interrupted. If and when the rechargeable battery is removed from the charging path during the charging operation, a large voltage is applied to the voltage dividing circuit by the charging voltage source and accordingly an abnormally high voltage is applied also to the voltage memory device. In such a case, by interrupting the charging path from the charging voltage source, as in the case of the embodiment, the voltage memory device or other circuit components can be prevented from being damaged by such abnormally high voltage.

In case of a charging apparatus employing an alternating current source as a charging voltage source and adapted for charging a battery with a half wave rectified current using a silicon controlled rectifier, for example, a synchronization circuit is provided for synchronizing the cycle for detecting the terminal voltage or the proportional voltage thereof of a rechargeable battery with an input cycle of the voltage memory circuit. Provision of such synchronization circuit can suppress diversification of a detected voltage caused by a fluctuation of the source voltage when the alternating current source is used as a charging voltage source and thus can suppress diversification of the interruption timing of the charging current. Such synchronization can prevent malfunction caused by an external noise such as a noise coming from an alternating current source line. In the case where an alternating current source is thus used as a charging voltage source, a smoothing circuit may be provided at the stage preceding and/or succeeding the voltage memory circuit. Such smoothing circuit can eliminate an influence exerted by a ripple current included in the voltage source.

Therefore, a principal object of the present invention is to provide an improved apparatus for charging a rechargeable battery.

Another object of the present invention is to provide an apparatus for charging a rechargeable battery that is capable of charging the largest possible charging quantity in a rapid charging mode without any fear of overcharging.

A further object of the present invention is to provide an apparatus for charging a rechargeable battery that is capable of charging the largest possible charging quantity in a rapid charging mode with a relatively simple structure.

Still a further object of the present invention is to provide an apparatus for charging a rechargeable battery that is capable of charging the largest possible charging quantity with the least possible influence exerted by the ambient temperature as compared with the conventional apparatus.

Still another object of the present invention is to provide an apparatus for charging a rechargeable battery that is capable of charging a relatively large charging quantity in a rapid charging mode by effectively utilizing an alternating current source as well as a direct current source as a charging voltage source.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
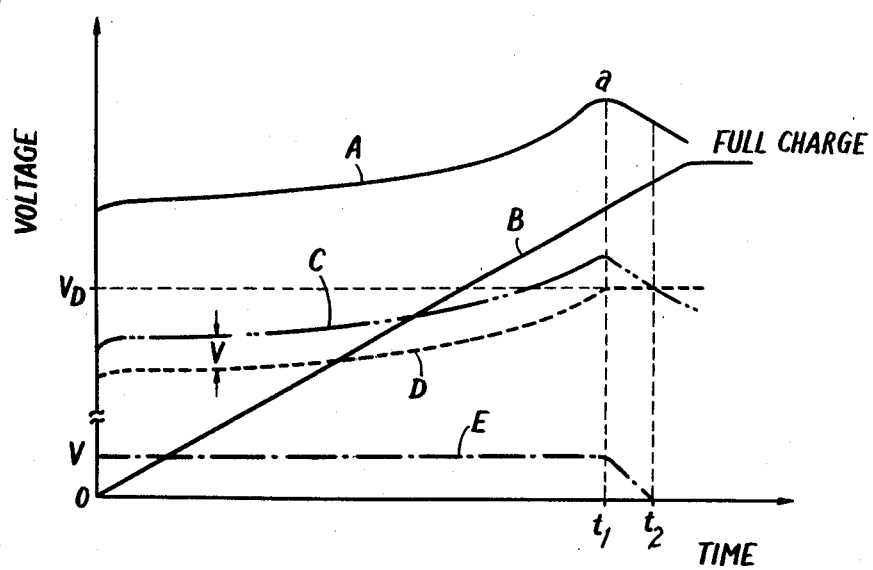
FIG. 1 is a graph explaining a charging characteristic of a gas tight sealed battery in which the present invention can be advantageously employed, wherein the abscissa indicates the time and the ordinate indicates the voltage.
Figure 2:
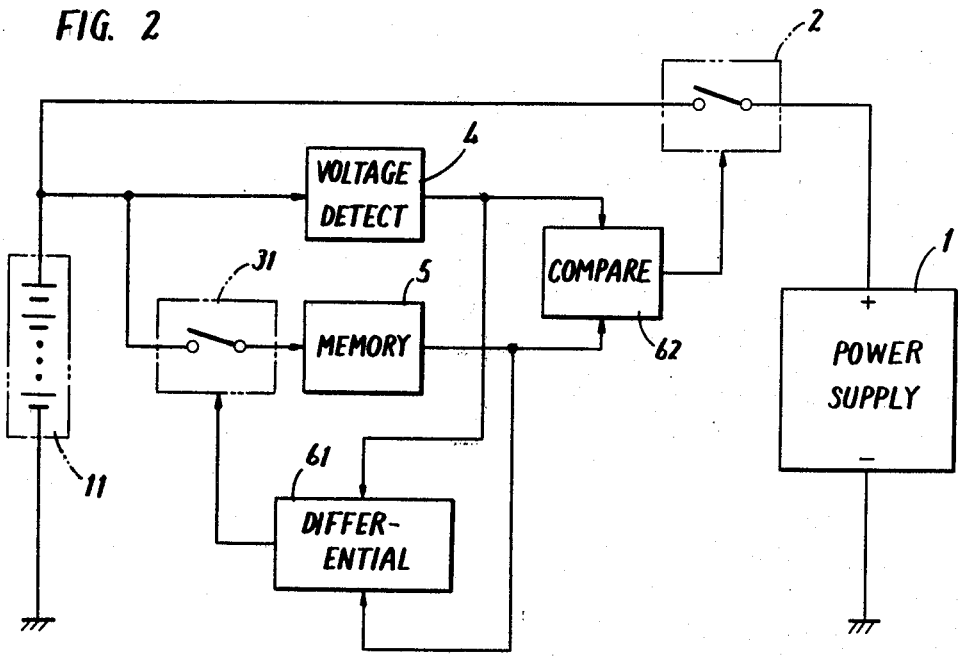
FIG. 2 is a block diagram showing the outline of the principle of the present invention.

FIG. 2 is a block diagram depicting the principle of the present invention. Referring to FIG. 2, a rechargeable battery (simply referred to as "battery" hereinafter) 11 is connected through a switch circuit 2 constituting a portion of a control means to a charging voltage source 1. The battery 11 has a charging voltage characteristic as described in conjunction with the curve A in FIG. 1 and is a gas tight sealed battery such as a nickel-cadmium battery. A voltage detecting circuit 4 is connected to the battery 11 for detecting a terminal voltage or a voltage proportional thereto of the battery 11. The terminal voltage or the proportional voltage thereof detected by the voltage detecting circuit 4 becomes as shown by the curve C in FIG. 1 and is applied to one input of a comparing circuit 62. The terminal voltage of the battery 11 is further applied through a switch circuit 31 to a voltage memory circuit 5. The voltage memory circuit 5 is designed to store or memorize a voltage lower, by a given voltage, than the detected voltage of the voltage detecting circuit 4 corresponding to the peak (denoted by "a") appearing in the charging voltage characteristic of the battery shown by the curve A in FIG. 1. Accordingly, the voltage being stored or memorized in the voltage memory circuit 5 has a relation associated with the charging voltage characteristic, as shown by the curve D in FIG. 1. The output voltage of the voltage memory circuit 5 is applied to the other input of the comparing circuit 62. Both the output voltage of the voltage detecting circuit 4 and the output voltage of the voltage memory circuit 5 are applied to a differential amplifying circuit 61. The differential amplifying circuit 61 is responsive to the difference between the output voltage of the voltage detecting circuit 4 and the output voltage of the voltage memory circuit 5 to provide the low level output when the difference voltage is lower than a predetermined voltage (shown as V in FIG. 1), thereby to open the switch circuit 31. Accordingly, it follows that the voltage memory circuit 5 ultimately stores the voltage immediately before the switch circuit 31 is opened. The comparing circuit 62 constituting a portion of the control means serves to compare the output voltage of the voltage detecting circuit 4 and the output voltage of the voltage memory circuit 5 to provide the high level output when the difference voltage exceeds a predetermined value (say zero), thereby to open the switch circuit 2. More specifically, the switch circuit 6 is responsive to the output of the comparing circuit 62 to interrupt a supply of a charging power from the charging voltage source 1 to the battery 11.

Figure 3A:
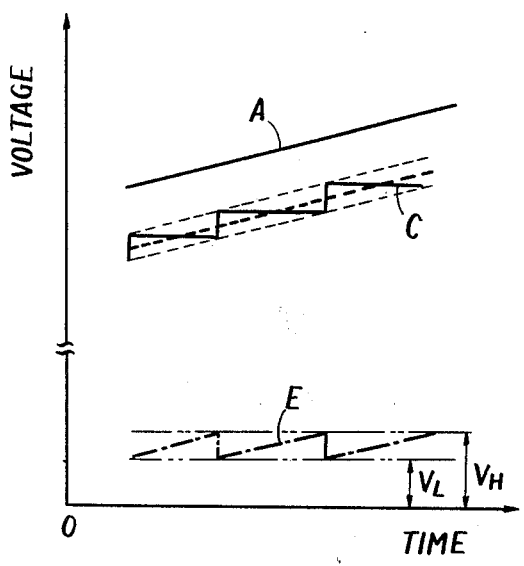
FIGS. 3A and 3B are graphs for explaining a variation of the stored voltage.
Figure 3B:
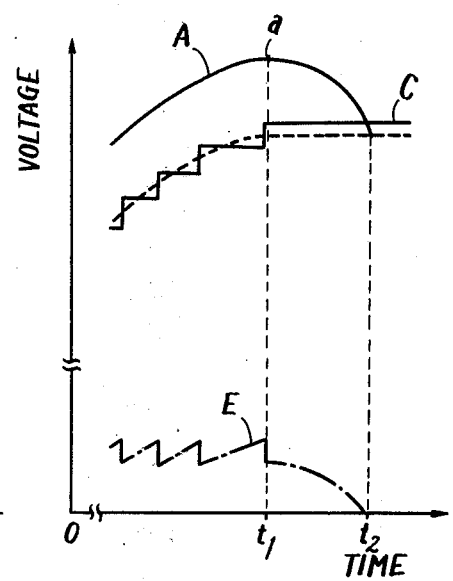

In operation, now consider a case where a battery 11 is a battery having no remaining electric charge therein. Then, upon turning on of the charging voltage source 1 by means of a switch, not shown, the switch circuit 2 has been closed and a power is applied from the voltage source 1 to the battery 11. The battery 11 is charged with the said charging current in accordance with the charging voltage characteristic as shown by the curve A in FIG. 1. On the other hand, the output voltage of the voltage detecting circuit 4 changes responsive to the terminal voltage of the battery 11 in accordance with the characteristic shown by the curve C in FIG. 1 and the output voltage of the voltage memory circuit 5 changes in accordance with the characteristic shown by the curve D in FIG. 1. More specifically, the voltage memory circuit 5 stores a certain voltage $V_D$ at that time corresponding to the peak point a of the characteristic. Accordingly, the difference voltage V between the output voltage of the voltage detecting circuit 4 and the output voltage of the voltage memory circuit 5 changes in accordance with the characteristic shown by the curve E in FIG. 1. In such a case, the output voltage of the voltage detecting circuit 4 is larger than the stored voltage of the voltage memory circuit 5, until the peak a of the charging voltage characteristic is reached, i.e. until the time $t_1$ is reached. Therefore, the reference voltage characteristic shown by the curve E in FIG. 1 exhibits, in a microscopic manner, a stepwise change as shown in FIG. 3A. More specifically, if and when the difference voltage V (the difference between the stored voltage and the detected voltage) becomes a predetermined value $V_H$, the output of the differential amplifying circuit 61 assumes the high level and the switch circuit 31 is closed. Soon thereafter the difference voltage becomes a given lower voltage $V_L$ and the output of the differential amplifying circuit 61 assumes the low level, so that the switch circuit 31 is opened. The cycle of the low level or the high level of the output of the differential amplifying circuit 61, i.e. the cycle of the opening or closing of the switch circuit 31 is dependent on the variation rate of the charging voltage characteristic (shown by the curve A) of the battery and is longer at the beginning of the charging operation and becomes shorter as shown in FIG. 3B in the vicinity of the peak point a of the charging voltage characteristic.

Thus, after the charging voltage characteristic passes the peak point a, the output voltage of the voltage detecting circuit 4 also gradually decreases in accordance with the charging voltage characteristic and therefore the difference V between the stored voltage of the voltage memory circuit 5 and the output voltage of the voltage detecting circuit 4 gradually decreases and finally the output of the differential amplifying circuit 61 comes to remain the low level. Therefore, the switch circuit 31 remains in the opened state and the stored voltage of the voltage memory circuit 5 comes to be held in the above described predetermined voltage $V_D$. Thus, the output voltage in accordance with the charging voltage characteristic and thus the output voltage of the voltage detecting circuit 4 becomes lower after the characteristic passes the peak point a and soon thereafter the difference between the output voltage and the stored voltage of the voltage memory circuit 5 becomes zero at the time $t_2$. Accordingly, at the time $t_2$ the output of the comparing circuit 62 assumes the low level and the switch circuit 2 is opened. Therefore, the charging current supplied from the voltage source 1 is interrupted and the battery 11 is not charged any more.

Thus, according to the present invention, a voltage determinable in association with the peak point appearing at the charging voltage characteristic inherent to a given rechargeable battery is stored and the difference voltage between the actual terminal voltage of the rechargeable battery or the proportional voltage thereof and the stored voltage is detected, thereby to control the charging operation of the battery 11, by utilizing the fact that the terminal voltage or the proportional voltage thereof of the battery becomes lower after the charging voltage characteristic passes the peak point. Therefore, it is necessarily after the charging voltage characteristic passes the peak point appearing therein that the difference between the actual terminal voltage or the proportional voltage thereof and the stored voltage becomes a predetermined value such as zero. As a result, the charging quantity of the battery can be increased as compared with the conventional apparatus. Although such timing (the time $t_2$ in FIG. 1) is slightly changeable depending on the ambient temperature, such influence is also mitigated as compared with the conventional apparatus. Accordingly, the present invention provides a charging apparatus for performing a stable charging operation.

Figure 4:
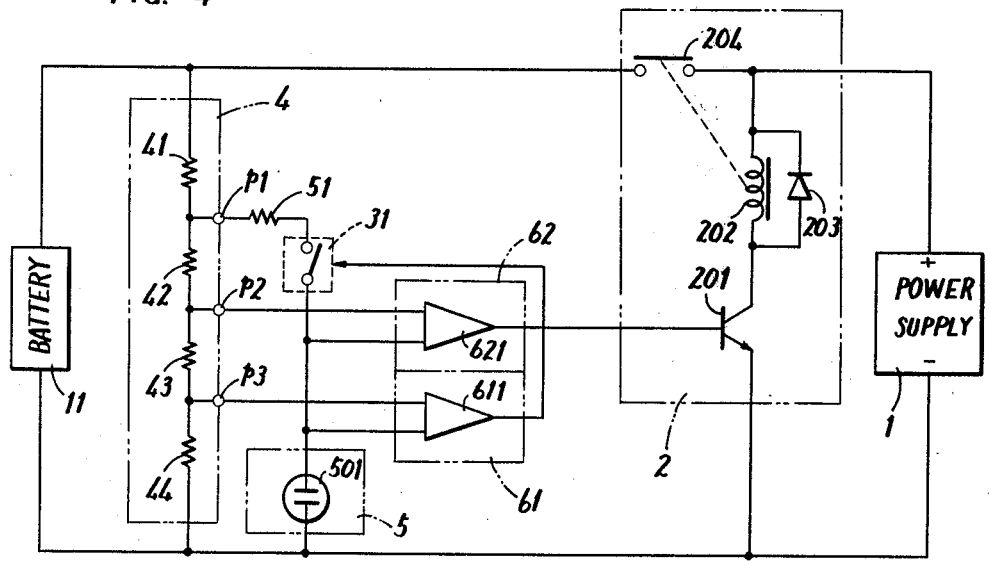
FIG. 4 is a schematic diagram showing one preferred embodiment of the present invention.

FIG. 4 is a schematic diagram showing a preferred embodiment of the present invention in accordance with the FIG. 2 block diagram. Referring to FIG. 4, the voltage detecting circuit 4 for detecting the terminal voltage or the proportional voltage thereof of the battery 11 comprises a series connection of four resistors 41, 42, 43 and 44, so that the series connection is connected to both terminals of the battery 11. The series connection of these resistors 41 to 44 constitutes a voltage dividing circuit having the output terminals P1, P2 and P3 for different voltages. The terminal P1 for providing the highest voltage among the voltage output terminals of the voltage dividing circuit or the voltage detecting circuit 4 is connected through the switch circuit 31 to the voltage memory circuit 5. The output terminal P2 for providing the lower voltage is connected to one input of an operational amplifier 621 constituting the comparing circuit 62. The remaining output terminal P3 for the lowest voltage is connected to one input of an operational amplifier 611 constituting the differential amplifying circuit 61. The voltage memory circuit 5 comprises a potential memory device 501. The terminal voltage of the potential memory device 501 is applied to the other input of the operational amplifier 611 and is also applied to the other input of the operational amplifier 621. The output of the operational amplifier 621 is connected to the base electrode of a transistor 201 constituting the switch circuit 2. A parallel connection of a relay coil 202 and a diode 203 is connected in series with the collector electrode of the transistor 201 and the above described series connection is connected to both terminals of the charging voltage source 1. A contact 204 turning on or off responsive to energization or deenergization of the relay coil 202 is interposed between the charging voltage source 1 and the battery 11.

Specifically, the above described voltage memory device 501 may comprise an electrochemical potential memory device. Such potential memory device is disclosed in U.S. Pat. No. 3,753,110 issued Aug. 14, 1973 to the same assignee as the present invention. However, an example of such electrochemical potential memory device will be briefly described.

Figure 5:
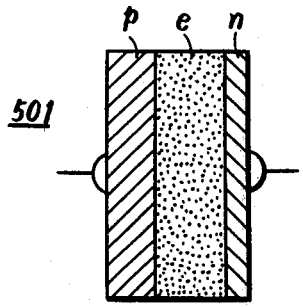
FIG. 5 is a cross sectional view showing a structure of an electrochemical potential memory device which may be used as one example of a voltage memory device.
Figure 6:
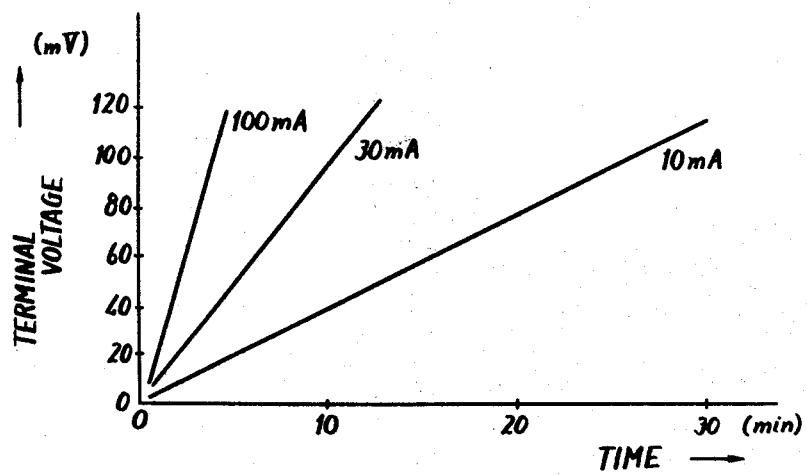
FIG. 6 is a graph depicting the characteristic of the FIG. 5 device, wherein the abscissa indicates the time and the ordinate indicates the terminal voltage.

FIG. 5 is a sectional view showing a structure of the electrochemical potential memory device 501. The electrochemical potential memory device is a kind of a battery having a structure including a solid electrolyte material e having a high ion conductivity such as $RbAg_4I_5$ or $Ag_3SI$ sandwiched between the cathode n mainly including silver or an alloy of silver-selenium and an anode mainly including an alloy of silver-tellurium or an alloy of silver-selenium. In the charging mode of the potential memory device, Ag of Ag-Te in the anode p becomes a form of ions to be solved in the solid electrolyte e and to be emigrated to the cathode n. In the discharging mode of the potential memory device, Ag of the cathode n conversely emigrates toward and is deposited on the anode p. The electromotive force of the potential memory device as a battery depends on the active amount (the density) of Ag in the Ag-Te alloy. In the case where the atom composition ratio of Ag and Te in the alloy Ag-Te is approximately 2, the active amount of Ag largely changes even by a slight charge or discharge. A relation between the electromotive force and the charging/discharging quantity of electricity is as shown in FIG. 6, wherein the relation becomes generally linear in the charging and discharging mode in the range of the electromotive force from zero to 100 mV, with the current density being smaller than 100 $\mu A/cm^2$.

Meanwhile, the electrochemical potential memory device 501 has a characteristic of holding a potential immediately before a supply of the current to the device is interrupted in the range of the potential from zero to 100 mV. Such device has been manufactured by the assignee of the present invention under the trademark of "Memoriode".

Now referring to FIG. 4, the resistor 51 interposed between the output terminal P1 of the voltage detecting circuit 4 and the switch circuit 31 will be described. If and when such resistor 51 is provided, the start of the operation of the voltage memory circuit 5 is delayed and accordingly the resistor 51 functions as a delay means. More specifically, since the current flowing into the potential memory device 501 (the charging current) becomes small by interposition of the resistor 51, the time point when the stored voltage of the device 501 becomes a voltage value having the above described predetermined potential difference V with respect to the voltage at the second output terminal P3 of the voltage detecting circuit 4 is delayed, with the result that the starting point of the operation of the operational amplifier 611 is delayed. The delay means, i.e. the resistor 51 is preferred in a case where the rechargeable battery 11 is an inactive battery. By an inactive battery is meant a battery in an inactive state which has been put in a discharged state for a long period of time or in the high temperature atmosphere, wherein an inactive film has been formed on the anode and cathode of the battery, so that an oxidizing and reducing reaction is temporarily dull to exhibit a large internal impedance.

Figure 7:
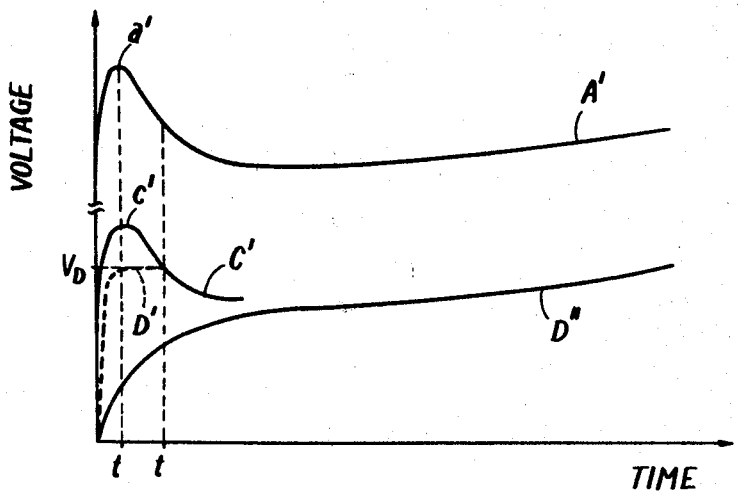
FIG. 7 is a graph depicting the charging characteristic of an inactive battery, wherein the abscissa indicates the time and the ordinate indicates the voltage.

When such inactive battery is charged, the charging voltage characteristic becomes such characteristic as shown by the curve A' in FIG. 7, wherein the second peak appears as a feature as shown as a' due to the above described internal impedance at the beginning of the charging operation. In the case where the charging voltage characteristic is as shown by the curve A' in FIG. 7, in the absence of the resistor 51 serving as the above described delay means, the potential memory device 501 comes to store the voltage at the time $t_3$ occurring at the second peak a', as shown by the dotted line D' in FIG. 7. On the other hand, the voltage at the output terminal P2 of the voltage detecting circuit 4, i.e. one input voltage of the operational amplifier 621 has such a characteristic as shown by the curve C' in proportion to the charging voltage characteristic shown by the curve A'. Accordingly, in the absence of the resistor 51, the difference voltage between the stored voltage $V_D$ of the potential memory device 501 and the output voltage of the output terminal P1 becomes zero at the time $t_4$ at the beginning of the charging operation. Therefore, the output of the operational amplifier 621 changes to the low level after the time $t_4$, whereby the contact 204 of the switch circuit 2 is opened. Therefore, in the case where such inactive battery is charged, the charging current from the voltage source 1 to the battery 11 is already interrupted at the given time $t_4$ at the beginning of the charging operation, in the absence of the resistor 51, whereupon the charging operation of the battery 11 is discontinued thereafter. In order to eliminate such inconvenience, the embodiment shown is provided with the resistor 51. By doing so, it follows that, as shown by the curve D'' in FIG. 7, the stored voltage characteristic of the potential memory device 501 included in the voltage memory circuit 5 does not follow the charging voltage characteristic shown by the curve A' at the beginning of the charging operation.

More specifically, provision of the resistor 51 controls the charging current flowing into the potential memory device 501, thereby to delay the starting point of such stored voltage following the charging voltage characteristic. Since the second peak appearing on the charging voltage characteristic of an inactive battery appears only at the beginning of such charging operation, provision of the resistor 51 does not exert an influence upon the peak a (FIG. 1) occurring immediately before the fully charged state.

Figure 8:
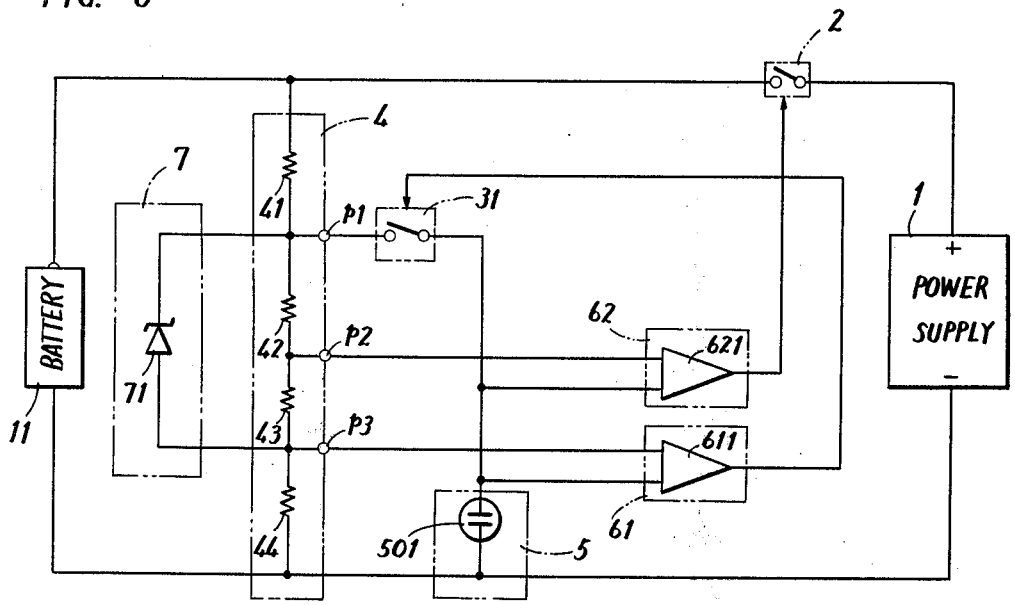
FIG. 8 is a schematic diagram showing another preferred embodiment of the present invention.

FIG. 8 is a block diagram showing the outline of another preferred embodiment of the present invention. The embodiment shown is substantially the same as the FIG. 4 embodiment, except for the following respects, and in the following only the different portions will be described, while a repetitive description will be omitted. A characteristic feature of the embodiment shown is that a constant voltage element 71 for constituting a constant voltage circuit 7 is connected between the terminals P1 and P3 of the voltage detecting circuit or the voltage dividing circuit 4. The constant voltage element 71 serves to normally maintain constant the voltage between the terminals P1 and P3 of the resistor voltage dividing circuit 4. The voltage from the output terminal P1 is applied to the voltage memory circuit 5 and the voltage from the output terminal P3 is applied to the operational amplifier 611. The voltage of the output terminal P1 is set to have a predetermined difference voltage V (FIG. 1) with respect to the voltage of the output terminal P3 but the set voltage V largely differs depending on the diversification of the terminal voltage of the battery 11 due to the ambient temperature. Therefore, the embodiment shown is provided with the constant voltage circuit 7, so that the difference voltage between the output of the output terminal P1 and the output of the output terminal P3, i.e. the set voltage V may be maintained constant. Accordingly, in the embodiment shown, the set voltage V is less influenced by the terminal voltage of the battery 11, with the result that a detection error in detecting the difference between the stored voltage corresponding to the peak point appearing on the charging voltage characteristic and the terminal voltage or the proportional voltage associated therewith after the peak point is passed can be decreased.

Figure 9:
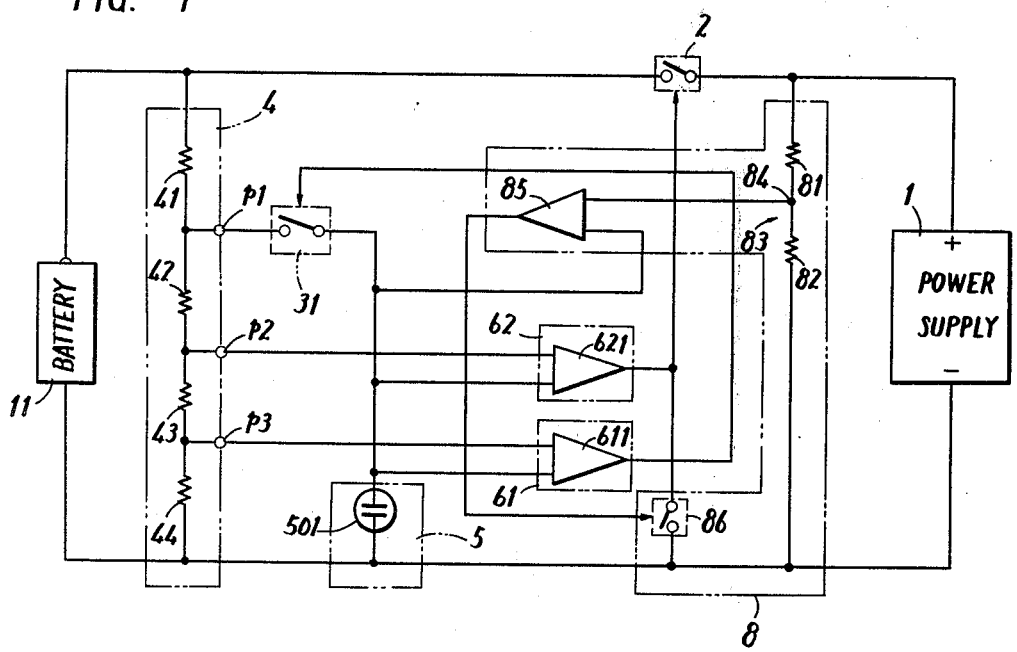
FIG. 9 is a schematic diagram showing a further preferred embodiment of the present invention.

FIG. 9 is a block diagram showing the outline of a further preferred embodiment of the present invention. The embodiment shown is substantially the same as the FIG. 4 embodiment, except for the following respects, and therefore only the different portion will be described, while a repetitive description will be omitted. A characteristic feature of the embodiment shown is that a detecting circuit 8 for detecting an abnormally high voltage is provided. More specifically, a voltage dividing circuit 83 including a series connection of resistors 81 and 82 is connected to both terminals of the charging voltage source 1. The voltage from the output terminal 84 of the voltage dividing circuit 83 is applied to one input of the operational amplifier 85. The other input of the operational amplifier 85 is connected to receive the voltage being applied to the voltage memory circuit 5, i.e. the output voltage of the output terminal P1 of the voltage detecting circuit 4. The operational amplifier 85 provides the high level output when the voltage being applied to the potential memory device 501 exceeds the output voltage of the output terminal of the voltage dividing circuit 83, i.e. the reference voltage, which high level output is applied to the switch circuit 86. The switch circuit 85 is responsive to the high level output of the operational amplifier 85 to be closed. Accordingly, the detecting circuit 8 closes the switch circuit 86, if and when the voltage being applied to the potential memory device 501 included in the voltage memory circuit 5 becomes a voltage higher than the reference voltage. When the switch circuit 86 is closed, the output of the operational amplifier 621 constituting the comparing circuit 62 is connected through the switch circuit 86 to ground, so that the output of the operational amplifier 621 being applied to the switch circuit 2 assumes the low level. Accordingly, the switch circuit 2 is opened. Therefore, in the embodiment shown, the switch circuit 2 is immediately opened when an abnormally high voltage is applied to the potential memory device 501, whereby the charging current from the charging voltage source 1 to the battery 11 is interrupted and the charging operation of the battery 11 is discontinued. According to the embodiment shown, the circuit components can be prevented from being damaged by such an abnormally high voltage.

Figure 10:
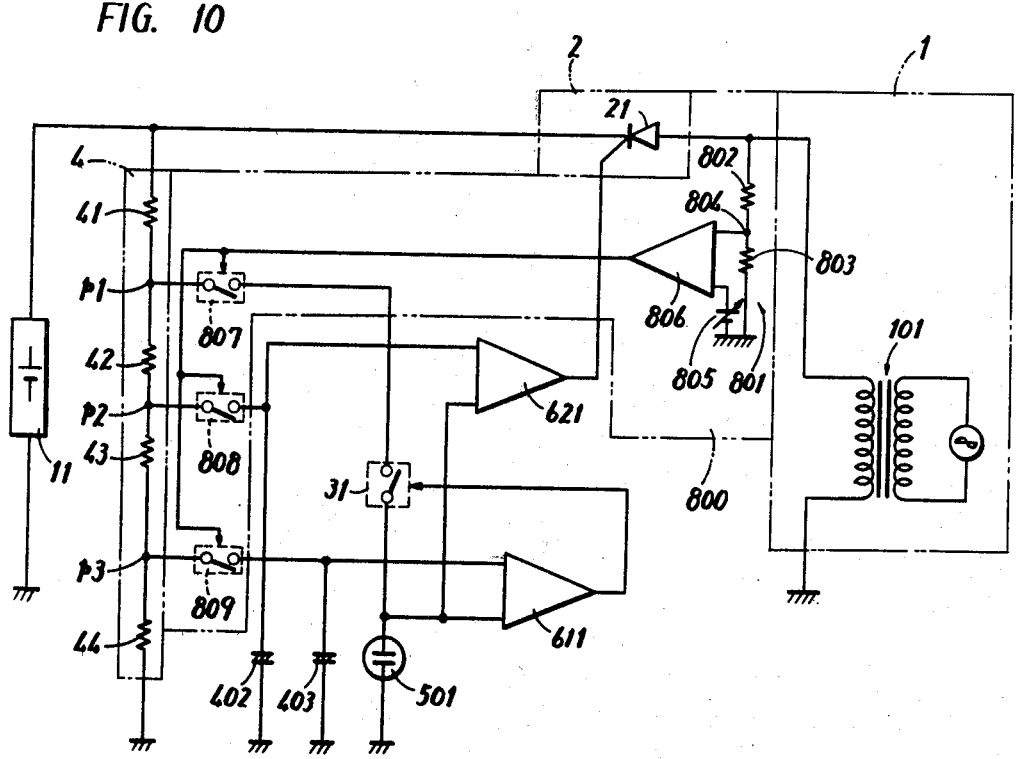
FIG. 10 is a schematic diagram showing still another preferred embodiment of the present invention.

FIG. 10 is a block diagram showing the outline of still a further embodiment of the present invention. The embodiment shown is different from the previously described embodiments in that the embodiment shown comprises an alternating voltage source as the charging voltage source 1. Since the embodiment shown comprises the charging current voltage source 1 of an alternating current source, the embodiment shown also comprises a synchronization circuit 800.

The charging voltage source 1 comprises a step-down transformer 101 connected to receive a commercial power supply. One end of the secondary winding of the transformer 101 is connected to the ground, while the other end of the secondary winding is connected to the anode of a thyristor 21 constituting the switch circuit 2. The cathode of the thyristor 21 is connected to the battery 11 and the voltage detecting circuit 4. The gate of the thyristor 21 is connected to receive the output of the operational amplifier 621 included in the comparing circuit 62. The other terminal of the output winding of the transformer 101 is connected to the voltage dividing circuit 801 comprising a series connection of resistors 802 and 803. The output terminal 804 of the voltage dividing circuit 801 is connected to one input of the operational amplifier 806 and the other input of the operational amplifier 806 is connected to receive the output voltage of the reference voltage source 805. On the other hand, the switch circuit 807 is interposed between the output terminal P1 of the voltage detecting circuit or the voltage dividing circuit 4 and the switch circuit 31 and the switch circuit 808 is interposed between the output terminal P2 and one input of the operational amplifier 621, and the switch circuit 809 is interposed between the output terminal P3 and one input of the operational amplifier 611. These switch circuits 807, 808 and 809 are responsive to the output of the operational amplifier 806 to be opened or closed. If and when the output voltage of the output terminal 804 of the voltage dividing circuit 801 becomes higher than the reference voltage of the voltage source 805, the operational amplifier 806 provides the timing pulse of the high level. Accordingly, the operational amplifier 806 provides such timing pulse for each cycle of the alternating current voltage source. The switch circuits 807, 808 and 809 are responsive to each timing pulse to be closed. Accordingly, the output voltages at the respective output terminals P1, P2 and P3 of the voltage detecting circuit 4 are applied to the associated circuit components for each timing pulse obtained from the operational amplifier 806. Voltage memory devices 402 and 403 for holding or storing the voltages intermittently obtained from the switch circuits 808 and 809, respectively, are connected to the output terminals P2 and P3, respectively. Although the voltage memory devices 402 and 403 may comprise electrochemical potential memory devices similar to the potential memory device 501 included in the voltage memory circuit 5, the same may be replaced by capacitors so that the same may be implemented with an inexpensive cost. One input of the operational amplifier 611 is supplied with the voltage held by the capacitor 403 and one input of the operational amplifier 621 is supplied with the voltage held by the capacitor 402.

The operational amplifier 621 included in the comparing circuit 62 functions in the same manner as that of the previously described embodiments. When the output of the operational amplifier 621 is the low level, a gate signal is not applied to the gate electrode of the thyristor 21 included in the switch circuit 2, so that the thyristor 21 is not rendered conductive any more.

Figure 11:
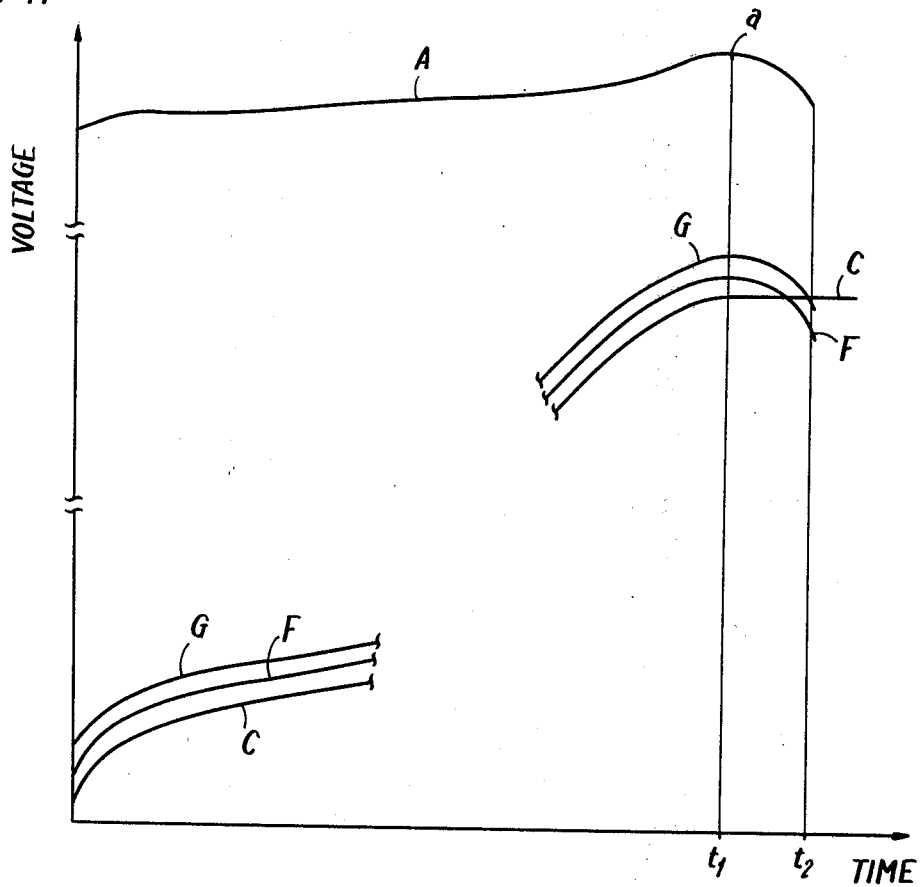
FIG. 11 is a graph depicting a variation of the voltage of the FIG. 10 embodiment, wherein the abscissa indicates the time and the ordinate indicates the voltage.
Figure 12:
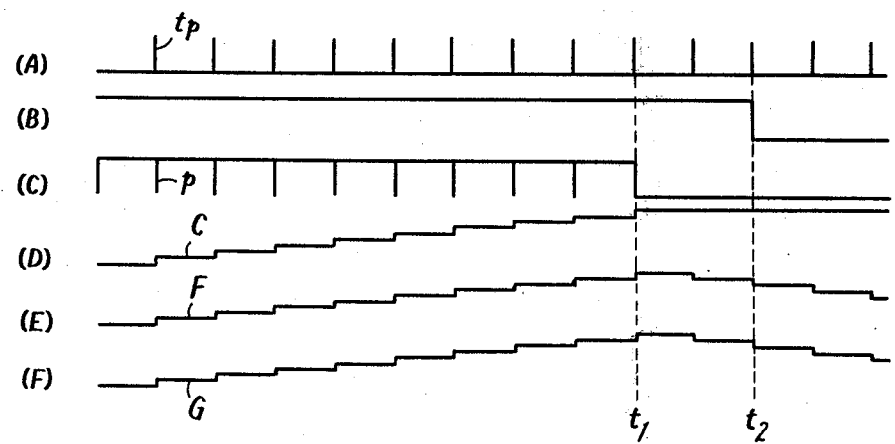
FIG. 12 is a timing chart for depicting the operation of the FIG. 10 embodiment.

The operation of the FIG. 10 embodiment will be described with reference to FIGS. 11 and 12. The operational amplifier 621 included in the control circuit or the comparing circuit 62 provides the low level output when the output voltage of the output terminal P2 of the voltage detecting circuit 4 comes to have a predetermined voltage difference (say zero) with respect to the stored voltage in the voltage memory circuit 5, although the output of the operational amplifier 621 remains the high level by that time. Accordingly, a gate signal of the high level is applied to the gate electrode of the thyristor 21 constituting the switch circuit 2, whereby the thyristor 21 is rendered conductive. The output of the step-down transformer 101 included in the charging voltage source 1 is applied through the thyristor 21 to the battery 11 at each positive (or negative) half cycle. Accordingly, the battery 11 is charged in accordance with the charging voltage characteristic shown by the curve A in FIG. 1. The timing pulse tp shown as (A) in FIG. 12 is obtained from the operational amplifier 806 included in the synchronization circuit 800 for each cycle of the alternating current voltage source. The switch circuits 807, 808 and 809 are responsive to the timing pulse tp to be temporarily closed. Therefore, at each timing pulse tp, the capacitors 402 and 403 and the potential memory device 501 store the corresponding output voltages, respectively, obtained from the voltage dividing circuit 4. The voltage memory device or the capacitor 402 stores the voltage as shown as (E) in FIG. 12, and the voltage memory device or the capacitor 403 stores the voltage as shown as (F) in FIG. 12. The characteristic of the stored voltage of the potential memory device 501 becomes as shown as (D) in FIG. 12. In such a case, the operational amplifier 611 provides the pulse output p, if and when the stored voltage in the voltage memory device 501 has a predetermined voltage difference with respect to the terminal voltage of the capacitor 403. Accordingly, the switch circuit 31 is responsive to the pulse output p to be opened, whereby the stored voltage of the potential memory device 501 included in the voltage memory circuit 5 follows a change of the terminal voltage of the capacitor 402, until the timing of the peak a, i.e. the time $t_1$, of the charging voltage characteristic shown by the curve A in FIG. 11 is reached. On the other hand, the terminal voltage of the capacitor 402 changes for each closing of the switch circuit 808, thereby to follow the charging voltage characteristic A. Accordingly, the voltage characteristics of the respective devices 402, 403 and 501 at the beginning of the charging operation become as shown by the curves F, G and D, respectively, in FIG. 11.

After the peak (shown as a), i.e. after the time $t_1$, of the charging voltage characteristic, the terminal voltage of the battery 11 decreases as shown by the curve A and therefore the terminal voltages of the capacitors 402 and 403 also decreases as shown by the curves F and G, respectively. On the other hand, the potential memory device 501 included in the voltage memory circuit 5 does not depend on such charging voltage characteristic, as described previously in conjunction with the previous embodiments. More specifically, after the time $t_1$, the output of the operational amplifier 611 assumes the low level as shown as (C) in FIG. 12 and accordingly the switch circuit 31 is placed in an opened state. Therefore, the stored voltage of the potential memory device 501 is maintained constant after the time $t_1$, as shown by the curve C in FIG. 11.

After the peak appearing on the charging voltage characteristic A, when the difference voltage between the stored voltage of the potential memory device 501 and the voltage of the capacitor 402 (the voltage proportional to the terminal voltage of the battery 11) becomes a predetermined value at the time $t_2$, the output of the operational amplifier 621 falls to the low level as shown as (B) in FIG. 12. Therefore, at that time the gate electrode of the thyristor 21 is not provided with the gate signal any more and the thyristor 21 is interrupted for the following half cycle of the alternating current signal. More specifically, at the time $t_2$ the charging current from the alternating current voltage source 1 to the battery 11 is interrupted, whereby the charging operation is stopped. Thus, in the embodiment shown the storing operation in the voltage memory circuit 5 and other operating and detecting functions are synchronized by the synchronization circuit 800. Accordingly, when an alternating current voltage source is used as the charging voltage source 1, diversification of detection because of a fluctuation of the source voltage is prevented and erroneous detection due to an external noise coming along the source voltage line can be prevented.

Figure 13:
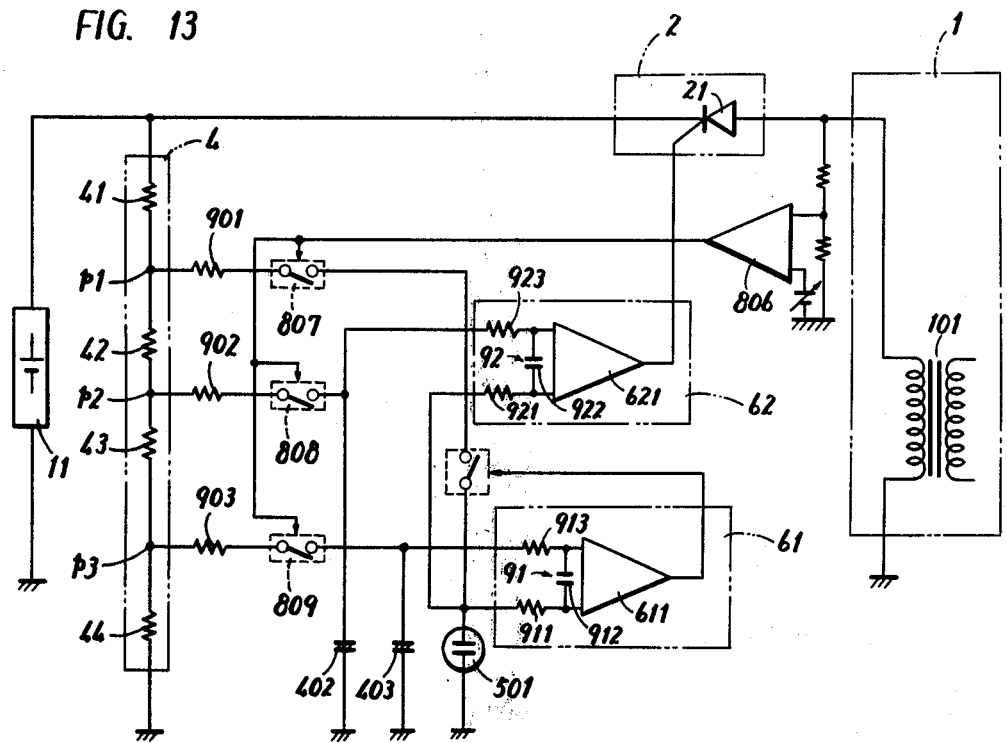
FIG. 13 is a schematic diagram showing still a further preferred embodiment of the present invention.

FIG. 13 is a block diagram showing still a further preferred embodiment of the present invention. The embodiment shown is substantially the same as the FIG. 10 embodiment, except for the following respects, and only the different portion will be described, while a repetitive description will be omitted. A characteristic feature of the embodiment shown is that a smoothing circuit 91 is provided in association with the input of the operational amplifier 611 and a smoothing circuit 92 is provided in association with the input of the operational amplifier 621.

Figure 14:
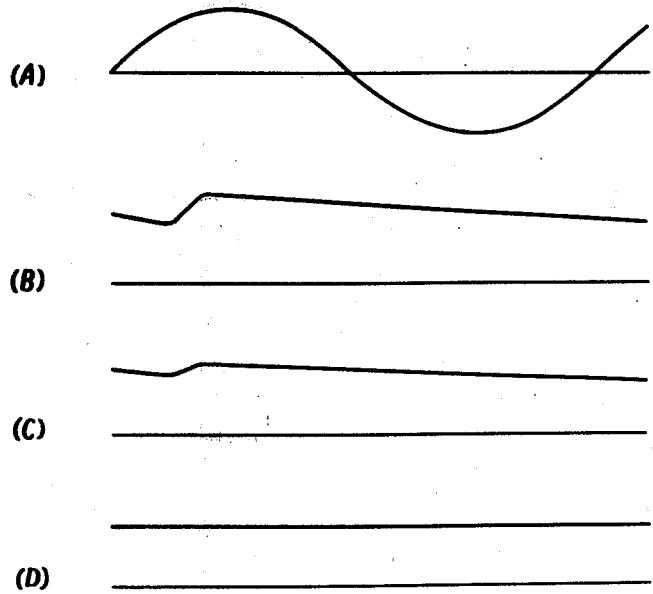
FIG. 14 is a graph showing the waveforms at various portions for depicting the operation of the FIG. 13 embodiment.

Such smoothing circuits 91 and 92 are designed to remove an inductive noise or a ripple current superposed on the input of the operational amplifiers 611 and 621 due to employment of an alternating current voltage source as the charging voltage source 1. Meanwhile, in order to more fully remove such ripple component or a noise component, resistors 901, 902 and 903 may be interposed between the output terminals P1, P2 and P3, and the switch circuits 807, 808 and 809, respectively. The resistors 901, 902 and 903 can remove not only the above described ripple component but also high frequency noise. Meanwhile, these resistors 901, 902 and 903 may be interposed between the switch circuit 807 and the switch circuit 31, between the switch circuit 808 and the capacitor 402, and between the switch circuit 809 and the capacitor 403, respectively. The manner of removing such ripple component will be described with reference to FIG. 14. The alternating current waveform shown as (A) in FIG. 14 is the output waveform of the transformer 101 included in the charging voltage source 1. Accordingly, the output waveform of the thyristor 21 becomes as shown as (B) in FIG. 14. The output voltages of the output terminals P1, P2 and P3 of the voltage dividing circuit or the voltage detecting circuit become as shown as (C) in FIG. 14. Meanwhile, the output voltage of the output terminal P1 is shown as (C) in FIG. 14 and the output voltages of the other output terminals P2 and P3 are lower than the output voltage of the output terminal P1, as a matter of course. The waveforms of the respective inputs of the operational amplifiers 611 and 621 are shown as (D) in FIG. 14. Meanwhile, the waveform (D) in FIG. 14 shows only one of them, representing the others, and the levels thereof change depending on the respective inputs or the state or the lapse of time. However, as seen from FIG. 14, even if an alternating current voltage source is used as the charging current voltage source, a complete direct current signal is provided at the respective inputs of the operational amplifiers 611 and 621, a ripple of an alternating current voltage source, a high frequency noise and the like being superposed. Accordingly, even when an alternating current voltage source is used as the charging voltage source, erroneous detection, malfunction and the like do not occur.

Figure 15:
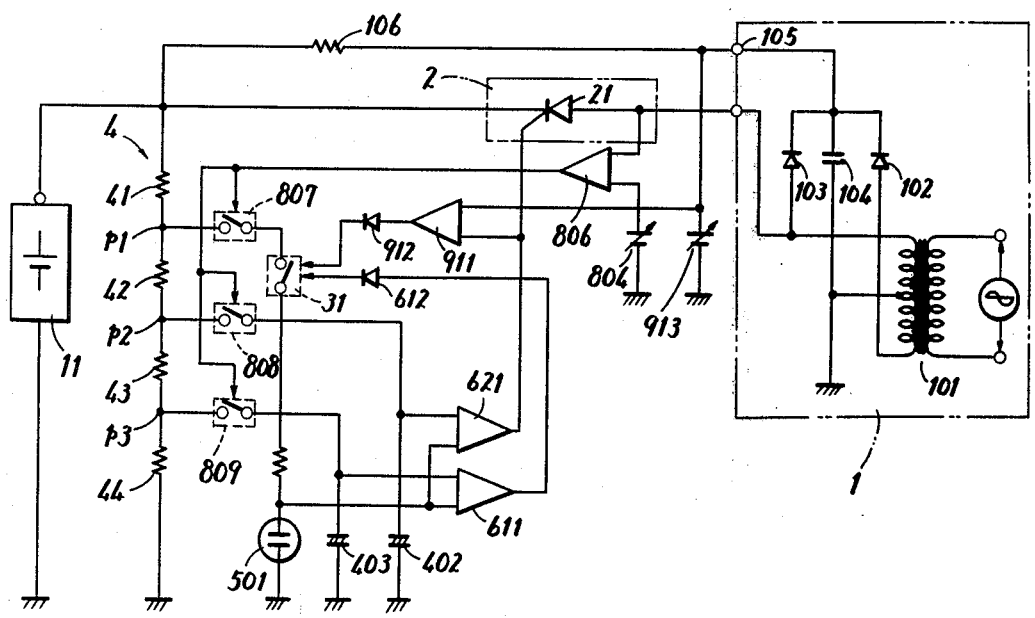
FIG. 15 is a block diagram of still a further preferred embodiment of the preset invention.

FIG. 15 is a block diagram showing still another preferred embodiment of the present invention. The embodiment shown is substantially the same as the FIG. 10 embodiment, except for the following respects and therefore only the different portions will be described, while a repetitive description will be omitted. A characteristic feature of the embodiment shown is that the operational amplifier 911 and the circuit components 912 and 913 associated therewith are provided for the purpose of achieving a holding function. In the embodiment shown, one end of the secondary winding of a step-down transformer 101 having the primary winding connected to the commercial power supply is applied to the switch circuit 2 as the alternating current output, as in the case of the FIG. 10 embodiment. The step-down transformer 101 of the embodiment shown is provided with a center tap in the secondary winding, which center tap is connected to the ground. Rectifying diodes 102 and 103 are connected to both ends of the secondary winding and a smoothing capacitor 104 is connected between the junctions of the rectifying diodes 102 and 103 and the ground. A direct current voltage is withdrawn from the output terminal 105 of the charging voltage source 1. The output terminal 105 is connected through the resistor 106 to one end of the battery 11. More specifically, the voltage is applied through the resistor 106 to the voltage dividing circuit 4.

The direct current output voltage from the output terminal 105 of the charging voltage source 1 as well as the reference voltage obtained from a suitable reference voltage source 913 is applied to one input of the operational amplifier 911. The other input of the operational amplifier 911 is connected to receive the output of the operational amplifier 621. The output of the operational amplifier 911 is applied through the diode 912 to the control input of the previously described switch circuit 31. In the embodiment shown, the output of the operational amplifier 611 is also applied through the diode 612 to the control input of the switch circuit 31. As in the case of the previously described embodiments, the switch circuit 31 comprises an analog switch such as a field effect transistor. In the case of the embodiment shown, the switch circuit 31 is designed such that the same is more preferentially responsive to the high level of the output of the operational amplifier 611 and the output of the operational amplifier 911, such that the switch circuit 31 is opened at the time when either turns to the high level while the other is the low level.

Now that a structure of the embodiment shown was described, an operation of the embodiment will be described with reference to FIGS. 16 to 18. Assuming that the battery 11 has been connected before the commercial voltage source is connected to the charging voltage source 1, i.e. before the time $t_0$ when the charging operation is started with reference to FIGS. 16 and 17, the switch circuits 31 and 807 to 809 have been closed. Accordingly, the capacitors 402 and 403 and the potential memory device 501 have been charged as shown by the curves F', G' and D' in FIG. 17.

If and when the commercial voltage source is connected at the time $t_0$ in such a situation, a direct current voltage is applied through the terminal 105 of the charging voltage source 1 and the resistor 106 to the battery 11 and the voltage detecting circuit or the voltage dividing circuit 4. Accordingly, the output voltages of the respective output terminals P1, P2 and P3 of the voltage dividing circuit 4 rise. Therefore, the terminal voltages of the capacitors 402 and 403 rise abruptly from that timing $t_0$, as shown in FIG. 17. On the other hand, since the potential memory device 501 is supplied with the voltage through the resistor 51 from the output terminal P1, the stored voltage abruptly rises as shown by the curve D' in FIG. 17. Accordingly, the terminal voltage of the capacitor 402 as one input to the operational amplifier 621 becomes higher than the stored voltage of the potential memory device 501 by a predetermined voltage, so that the output of the operational amplifier 621 becomes the high level at that time. As the output of the operational amplifier 621 becomes the high level, a holding function by the operational amplifier 911 is released, so that an opening/closing operation of the switch circuit 31 becomes dependent on the output of the operational amplifier 611, while a gate signal is applied to the thyristor 21 constituting the switch circuit 2, thereby to render the same conductive. Conduction of the thyristor 21 charges the battery 11 for each positive half cycle of the alternating current voltage source, as described previously, so that the charging voltage characteristic of the battery 11 becomes as shown by the curve A' in FIG. 16.

In such a case, one timing pulse $t_p$, (shown as (A) in FIG. 12) is generated for each cycle of the alternating current voltage source from the operational amplifier 806 constituting the synchronization circuit, so that the switch circuits 807 to 809 are closed in synchronism with the pulse, as described previously. Accordingly, the voltages of the capacitors 402 and 403 and the potential memory device 501 change in a stepwise manner, as previously described with reference to FIG. 12.

Figure 16:
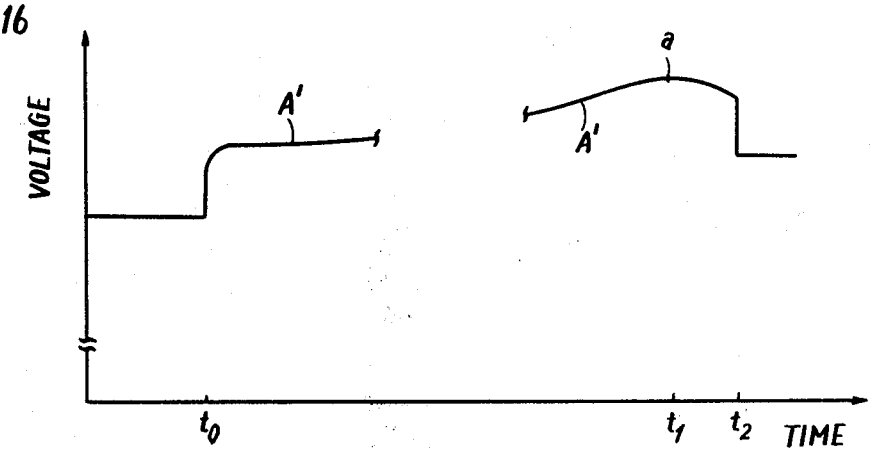
FIGS. 16, 17 and 18 are graphs showing variations of the voltage for depicting the operation of the FIG. 15 embodiment, wherein the abscissa indicates the time and the ordinate indicates the voltage.
Figure 17:
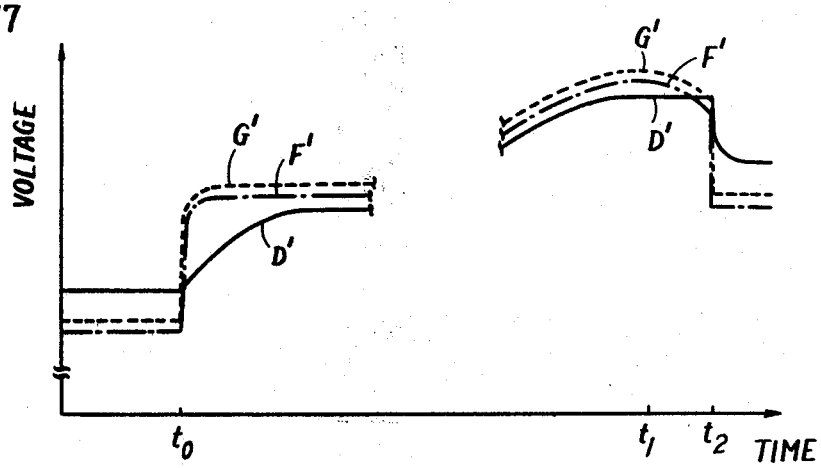
Figure 18:
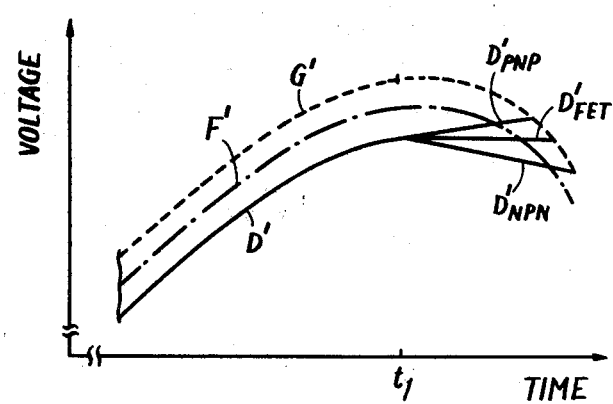

After the peak point a, i.e. after the time $t_1$ of the charging voltage characteristic shown by the curve A' in FIG. 16, the terminal voltage of the capacitor 402 and the terminal voltage of the capacitor 403 both fall in accordance with the charging voltage characteristic, as shown in FIG. 17. Therefore, the voltage difference of the two inputs of the operational amplifier 611 becomes smaller than a predetermined voltage V, so that the output of the operational amplifier 611 assumes the low level. Accordingly, the switch circuit 31 is opened responsive to the output of the operational amplifier 611 and the stored voltage of the potential memory device 501 becomes constant after the timing $t_1$, as shown by the curve D' in FIG. 17. If and when the difference between two input voltages of the operational amplifier 621 becomes a predetermined voltage (say zero), the gate signal of the thyristor 21 assumes the low level and the thyristor 21 is interrupted after the following negative half cycle and the charging operation of the battery 11 from the charging voltage source 1 is stopped, as described previously.

When the charging operation of the battery 11 is stopped responsive to interruption of the thyristor 21, the terminal voltage of the battery 11 falls, and the respective voltages of the capacitors 402 and 403 and the potential memory device 501 accordingly fall after that time $t_2$, as shown by the curves F', G' and D' in FIG. 17. Since the output of the operational amplifier 621 assumes the low level at that time, the output of the operational amplifier 911 assumes the high level. The output of the high level obtained from the operational amplifier 911 is applied through the diode 912 to the switch circuit 31 and the switch circuit 31 is accordingly closed. When the switch circuit 31 is closed, the stored voltage of the potential memory device 501 comes to correspond to the output voltage of the output terminal P1 of the voltage detecting circuit or the voltage dividing circuit. On the other hand, the terminal voltage of the capacitor 402 has come to correspond to the output voltage of the output terminal P2 of the voltage dividing circuit 4. Accordingly, the stored voltage of the potential memory device 501 is maintained in a value higher than the terminal voltage of the capacitor 402 by a voltage drop across the resistor 42 and accordingly the output of the operational amplifier 621 remains at the low level, while the thyristor is maintained as interrupted. The embodiment shown is characterized by such operational amplifier 911 for performing the holding function and the associated circuit.

More specifically, the operational amplifiers 611 and 621 are implemented by TTL circuits. If and when the operational amplifiers 611 and 621 of such TTL circuits have PNP inputs, an input bias current flows into the potential memory device 501, thereby to raise the stored voltage. Conversely, the operational amplifiers 611 and 621 have NPN inputs, a current flows from the potential memory device 501 to the operational amplifiers 611 and 621, so that the stored voltage of the potential memory device 501 falls. More specifically, in the case of PNP inputs, the stored voltage of the potential memory device 501 rises, as shown by the curve $D'_{PNP}$ in FIG. 18. On the contrary, in the case of NPN inputs, the stored voltage of the device 501 falls as shown by the curve $D'_{NPN}$ in FIG. 18. The curve $D'_{FET}$ of FIG. 18 shows a case where the operational amplifiers 611 and 621 are structured to comprise FET inputs. In the case where the stored voltage of the potential memory device 501 fluctuates, if and when the operational amplifiers of the NPN inputs are employed, it could happen that the charging operation can not be stopped by the fall of the stored voltage of the potential memory device 501, depending on the external conditions such as the kind of the battery 11, the magnitude of the charging current and the like. More specifically, in the case of the NPN inputs, the voltage falls as shown by the curve $D'_{NPN}$ in FIG. 18 and the times when the output of the operational amplifier 621 turns to the low level is delayed as compared with the times $t_2$, for example, with the result that the battery 11 could be overcharged depending on the case.

Therefore, according to the embodiment shown, preferably the TTL circuits having the PNP inputs are used as the operational amplifiers 611 and 621. By doing so, the above described overcharging is avoided. More specifically, by utilizing the operational amplifiers 611 and 621 of the PNP inputs, the timing when the output of the operational amplifier 621 turns to the low level could be advanced as compared with the timing $t_2$ but will not be delayed than that.

However, if and when the operational amplifiers 611 and 621 having the PNP inputs are used, the terminal voltage of the battery 11 rises until the stored voltage of the potential memory device 501 ultimately reaches the source voltage, thereby to damage the potential memory device 501, unless the charging current from the charging voltage source 1 is assuredly interrupted after the charging operation of the battery 11 is stopped. Therefore, the embodiment shown is provided with the previously described holding circuit or the operational amplifier 911 and the circuit associated therewith. More specifically, if and when the output of the operational amplifier assumes the low level after the time $t_2$ in FIG. 17, for example, the output of the operational amplifier 911 becomes the high level, whereby the switch circuit 31 is maintained in a closed state. Therefore, it follows that the potential memory device 501 is connected to the output terminal P1 of the voltage dividing circuit 4 and the input biasing current of the operational amplifier 621 having the PNP input flows through the voltage dividing circuit to the ground in association with the intermittent closing of the switch circuit 807. Therefore, the stored voltage of the potential memory device 501 is maintained in the output voltage of the output terminal P1 and accordingly the device 501 and the like is prevented from being damaged.

Meanwhile, two or more of the previously described embodiments may be employed by properly combining the same. For example, the FIG. 15 embodiment may be applied to those embodiments wherein a direct current voltage source is employed as the charging voltage source as shown in FIG. 4, and conversely the embodiments employing the direct current charging voltage source 1 may be applied to those embodiments of the alternating current charging voltage source.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for charging a rechargeable battery having a charging voltage characteristic exhibiting a peak value shortly before said rechargeable battery reaches a fully charged state and thereafter exhibiting a gradually decreasing charge until said fully charged state is reached, said apparatus comprising:

charging voltage source means for supplying an electric current for charging said rechargeable battery, means coupled to said rechargeable battery for providing a voltage associated with the terminal voltage of said rechargeable battery as it is being charged, voltage memory means responsive to said charging voltage characteristic of said rechargeable battery and based on said associated voltage obtained from said voltage providing means for storing at the time of the peak of said battery charging voltage characteristic a first voltage which is less than said associated voltage by a predetermined voltage and for maintaining said first voltage after the peak of the battery charging characteristic has passed and said associated voltage decreases, stored voltage control means for controlling said voltage being provided from said associated voltage providing means to said voltage memory means to limit the voltage stored by said voltage memory means to said first voltage, comparing means for comparing said stored voltage in said voltage memory means and said associated voltage obtained from said voltage providing means after said peak of said charging voltage characteristic of said rechargeable battery is passed, and control means responsive to the output of said comparing means for controlling said electric current supplied from said charging voltage source means to said rechargeable battery.

2. A charging apparatus in accordance with claim 1, wherein said voltage providing means is adapted to provide a voltage which is lower than and is proportional to said terminal voltage of said rechargeable battery as said associated voltage.

3. A charging apparatus in accordance with claim 2, wherein said stored voltage control means comprises stored voltage detecting means for detecting said stored voltage of said voltage memory means, and switching means responsive to the output of said stored voltage detecting means for interrupting the supply of said voltage from said associated voltage providing means to said voltage memory means.

4. A charging apparatus in accordance with claim 3, wherein said stored voltage detecting means comprises differential circuit means having two inputs, one input of said differential circuit means being supplied with said stored voltage of said voltage memory means, and the other input of said differential circuit means being supplied with a different associated voltage of said voltage providing means, the output of said differential circuit means being applied to said switching means.

5. A charging apparatus in accordance with claim 4, wherein said different associated voltage provided from said voltage providing means to said other input of said differential circuit means is selected to have a predetermined voltage difference with respect to a voltage being stored in said voltage memory means.

6. A charging apparatus in accordance with claim 1, wherein said associated voltage providing means comprises voltage dividing means including a series connection of a plurality of resistors connected to receive the terminal voltage of said rechargeable battery at both ends of said series connection.

7. A charging apparatus in accordance with claim 6, wherein said voltage dividing means comprises a plurality of voltage output terminals associated with a plurality of different voltage values, said voltage memory means receiving said associated voltage from a predetermined one of said plurality of voltage output terminals, and differential circuit means for receiving said associated voltage from another one of said plurality of voltage output terminals.

8. A charging apparatus in accordance with claim 7, wherein said predetermined voltage output terminal of said voltage dividing means provides a voltage which is lower, by said predetermined voltage, than said terminal voltage of said rechargeable battery.

9. A charging apparatus in accordance with claim 8, which further comprises constant voltage circuit means for rendering constant the voltage difference between said predetermined voltage output terminal and said another voltage withdrawing output terminal.

10. A charging apparatus in accordance with claim 9, wherein said constant voltage circuit means comprises a Zener diode connected in parallel with a predetermined one of said plurality of resistors.

11. A charging apparatus in accordance with claim 10, wherein said applied voltage detecting means comprises differential circuit means having two inputs and having the output thereof applied to said switching means, and which further comprises constant voltage providing means for providing a constant voltage, one input of said differential circuit means being supplied with said voltage applied to said voltage memory means, and the other input of said differential circuit means being supplied with said constant voltage obtained from said constant voltage providing means.

12. A charging apparatus in accordance with claim 11, wherein said constant voltage providing means comprises voltage dividing circuit means coupled to said charging voltage source means.

13. A charging apparatus in accordance with either claim 1, which further comprises delay means for delaying the application of said associated voltage from said voltage providing means to said voltage memory means.

14. A charging apparatus in accordance with claim 13, wherein said delay means comprises a resistor.

15. A charging apparatus in accordance with claim 13, wherein said rechargeable battery comprises an inactive battery.

16. A charging apparatus in accordance with claim 1, wherein said comparing means comprises an operational amplifier having two inputs, one input of said operational amplifier being supplied with said stored voltage of said voltage memory means, and the other input of said operational amplifier being supplied with said associated voltage of said voltage providing means.

17. A charging apparatus in accordance with claim 16 further comprising means for selecting said associated voltage being applied from said voltage providing means to the other input of said operational amplifier to have a value lower than the voltage being applied from said voltage providing means to said voltage memory means.

18. A charging apparatus in accordance with claim 17, wherein said associated voltage providing means comprises voltage dividing circuit means receiving said terminal voltage of said rechargeable battery.

said voltage dividing circuit means comprises a plurality of output terminals for providing a plurality of different voltages, and the voltage from one of said plurality of output terminals being applied to said voltage memory means and the voltage from another output terminal being applied to said other input of said operational amplifier.

19. A charging apparatus in accordance with claim 16, wherein said operational amplifier comprises TTL's have PNP inputs.

20. A charging apparatus in accordance with claim 1, wherein said control means is adapted to interrupt said electric current from said charging voltage source to said rechargeable battery when the two voltages being applied to said comparing means come to have a predetermined voltage difference.

21. A charging apparatus in accordance with claim 20, wherein said predetermined voltage difference is zero.

22. A charging apparatus in accordance with claim 20, which further comprises holding means for holding substantially constant said stored voltage of said voltage memory means after said electric current from said charging voltage source to said rechargeable battery is interrupted.

23. A charging apparatus in accordance with claim 22, wherein said holding means comprises connection means responsive to the output of said comparing means for connecting said voltage memory means to said associated voltage providing means.

24. A charging apparatus in accordance with claim 23, wherein said connection means comprises switching means coupled between said associated voltage providing means and said voltage memory means and responsive to the output of said comparing means for being operable.

25. A charging apparatus in accordance with claim 1, wherein said charging voltage source comprises
   alternating current voltage source means, and
   rectifying means for rectifying said alternating current voltage from said alternating current voltage source means.

26. A charging apparatus in accordance with claim 25, wherein said rectifying means comprises half wave rectifying means.

27. A charging apparatus in accordance with claim 25, wherein
   said rectifying means comprises a rectifying element having a control electrode, and
   said control means comprises gate signal generating means for providing a gate signal to said control electrode of said rectifying element having a control electrode.

28. A charging apparatus in accordance with claim 27, which further comprises switching means coupled between said associated voltage providing means and said voltage memory means and responsive to said gate signal for being rendered conductive.

29. A charging apparatus in accordance with claim 26, which further comprises voltage holding means coupled to the output of said associated voltage providing means.

30. A charging apparatus in accordance with claim 29, wherein said voltage holding means comprises capacitor means.

31. A charging apparatus in accordance with claim 25, which further comprises smoothing means provided at least one of between said associated voltage providing means and said voltage memory means and between said voltage memory means and said comparing means.

32. A charging apparatus in accordance with claim 1, wherein said voltage memory means comprises an electrochemical potential memory device.

33. An apparatus for charging a rechargeable battery having a charging voltage characteristic exhibiting a peak value shortly before said rechargeable battery reaches a fully charged state and thereafter exhibiting a gradually decreasing charge until said fully charged state is reached, said apparatus comprising:
   charging voltage source means for supplying an electric current for charging said rechargeable battery,
   means coupled to said rechargeable battery for providing a voltage associated with the terminal voltage of said rechargeable battery as it is being charged,
   voltage memory means responsive to said charging voltage characteristic of said rechargeable battery and based on said associated voltage obtained from said voltage providing means for storing at the time of the peak of said battery charging voltage characteristic a first voltage which is less than said associated charge by a predetermined voltage and for maintaining said first voltage after the peak of the battery charging characteristic has passed and said associated voltage decreases,
   applied voltage detecting means for detecting said voltage being applied to said voltage memory means, and
   switching means responsive to the output of said applied voltage detecting means for interrupting said voltage being applied from said associated voltage providing means to said voltage memory means to limit the voltage stored by said voltage memory means to said first voltage,
   comparing means for comparing said stored voltage in said voltage memory means and said associated voltage obtained from said voltage providing means after said peak of said charging voltage characteristic of said rechargeable battery is passed, and
   control means responsive to the output of said comparing means for controlling said electric current supplied from said charging voltage source means to said rechargeable battery.

* * * * *